United States Patent [19]

Kainov et al.

[11] 4,244,179
[45] Jan. 13, 1981

[54] ANNULAR COMBUSTION CHAMBER FOR GAS TURBINE ENGINES

[76] Inventors: Gennady P. Kainov, ulitsa Pervomaiskaya, 35, kv. 52; Vladimir G. Kuznetsov, ulitsa Timiryazeva, 33, kv. 4; Anatoly M. Polyakov, ulitsa Gorkogo, 35, kv. 6; Igor A. Shleenkov, ulitsa Timiryazeva, 32, kv. 70, all of Stupino Moskovskoi oblasti, U.S.S.R.

[21] Appl. No.: 959,180

[22] Filed: Nov. 9, 1978

Related U.S. Application Data

[63] Continuation of Ser. No. 764,732, Feb. 1, 1977, abandoned.

[51] Int. Cl.² ............................................. F02C 7/22
[52] U.S. Cl. ................................. 60/39.36; 60/757; 60/758; 60/760
[58] Field of Search ........................... 60/39.36, 39.65

[56] References Cited

U.S. PATENT DOCUMENTS

| | | | |
|---|---|---|---|
| 2,930,192 | 3/1960 | Johnson | 60/39.65 |
| 3,333,414 | 8/1967 | Saintsbury | 60/39.65 |
| 3,603,082 | 2/1970 | Sneeden et al. | 60/39.36 |
| 3,645,095 | 2/1972 | Melconian | 60/39.36 |
| 3,820,324 | 6/1974 | Grindley et al. | 60/39.65 |
| 3,869,864 | 3/1975 | Bunn | 60/39.36 |
| 3,952,503 | 4/1976 | Fox et al. | 60/39.65 |
| 4,018,043 | 4/1977 | Clemmens | 60/39.36 |

*Primary Examiner*—Robert E. Garrett
*Attorney, Agent, or Firm*—Haseltine, Lake & Waters

[57] ABSTRACT

An annular combustion chamber which has structural elements for delivery of primary air to sustain and stabilize burning and elements for admission of secondary air into the dilution zone. The primary air delivery elements intended for stabilization of burning are made so that at least two curved slotted passages are formed for tangential admission of the air into the combustion zone. The passage wall plates are concentric, being arranged so that the outer wall plate of each preceding passage is naturally the inner wall plate of the subsequent one displaced relative to the former in the downstream direction. The slotted passages have a substantially constant flow-passage along the entire annular combustion chamber periphery (length).

1 Claim, 1 Drawing Figure

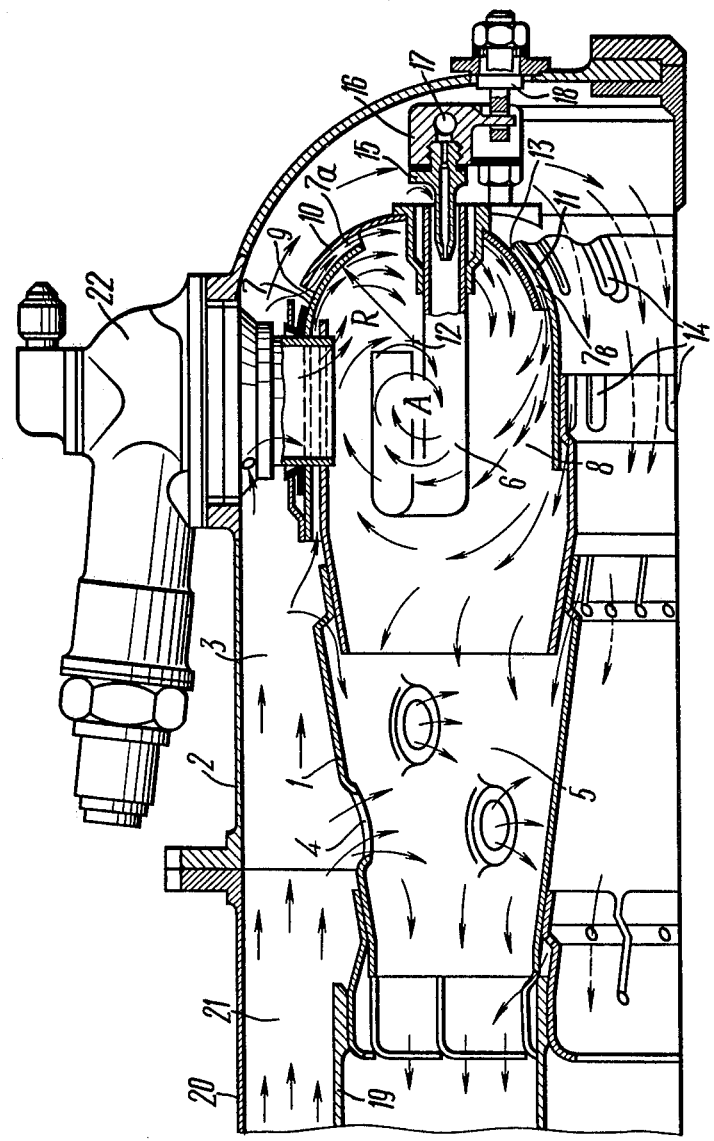

ANNULAR COMBUSTION CHAMBER FOR GAS TURBINE ENGINES

This is a continuation of application Ser. No. 764,732 now abandoned filed Feb. 1, 1977.

The present invention relates to gas turbine engines, and more particularly to annular combustion chambers.

The present invention is to be preferably used in aircraft gas turbine engines in which gas products generated in an annular combustion chamber are used as the working medium.

This invention is also advantageous for use in annular fuel vaporizer type reverse-flow combustion chambers wherein intermixing of fuel particles and primary air as well as combustion process stabilization are effected with the aid of vortices.

The average velocity of the fuel-air mixture flow is always greater than the rate of the turbulent combustion process in gas turbine engine combustion chambers. Therefore, it is essential, at present, to provide for reliable ignition and steady-state combustion particularly in aircraft gas turbine engines under any operating conditions, as well as to ensure complete burning of fuel with the desirable gas flow temperature distribution at the combustion chamber outlet. Unreliable ignition and unsteady burning of fuel considerably impair the serviceability of a gas turbine engine; incomplete burning of fuel deteriorates the fuel economy characteristics; unsuitable gas flow temperature distribution at the combustion chamber outlet adversely affects the service life and strength characteristics of the gas turbine fed from the combustion chamber and of the engine as a whole.

The solution to the foregoing problems greatly depends on proper mixing of fuel with air within the combustion zone and on formation of steady circulation zones of hot gases moving in the reverse direction from the flame to ensure vaporization and ignition of fuel. The desired conditions for fuel burning are attained by means of flame stabilizers intended to form reverse flows with the aid of a vane-type swirler, or a bluff body, or by creating appropriate high-velocity air streams.

The high-velocity air streams, if so arranged that hot gas vortical zones are formed, offer the best solution to the above-stated problems, since the specific structure of gas flows within the vortical zones creates more favourable conditions for uniform distribution of the fuel-air mixture across the combustion chamber, which, in turn, promotes more reliable ignition of the flammable mixture and flame propagation within the entire combustion zone, as well as provides for more smooth burning of the mixture with a resultant uniform circumferential temperature field. The movement of the fuel-air mixture within a vortex zone substantially along a curved path materially increases the mixture dwell time in the combustion zone, thus ensuring complete burning of the mixture over a smaller length of the combustion chamber.

Heretofore, attempts have been made to construct combustion chambers provided with means for promotion of a hot gas vortex circulation zone in order to mix fuel with primary air and stabilize the burning process.

In one of the prior proposals an annular combustion chamber of the fuel vaporizer type comprises structural elements for delivery of a portion of primary air to the combustion zone to produce a combustible fuel-air mixture and stabilize burning of the mixture. The combustion chamber is housed in the engine casing so that the outer shell of the latter is used as an outer wall of said chamber. An annular narrow passageway for air is formed between the engine casing inner shell and combustion chamber inner wall. The front portion of said chamber comprises a divergent duct confined by a cylindrical ring which is attached to the combustion chamber end wall.

Stationary guide vanes are installed at the duct entry and vaporizer tubes fastened to the engine casing outer shell are positioned in the duct outlet in the way of discharged air flow, said tubes being used as elements to disperse fuel and admit a small amount of primary air to the combustion zone.

Located downstream of the vaporizer tubes are structural elements whose function is to deliver another portion of primary air for stabilization of burning. These elements are substantially radial inwardly protruding deflectors attached to the engine casing outer shell. Primary and secondary air is admitted into the combustion chamber as a single high-energy peripheral sheath flowing through the diffuser duct in the combustion chamber entry portion. When the air flow reaches the chute-like deflectors, a greater portion of the air flow passes by the deflectors to be delivered into the dilution zone, while a lesser portion, the primary air used to stabilize burning, encounters the deflectors and is caused to flow first towards the inner wall, then along the inner wall towards the forward end wall to be further entrained by the peripheral air flow due to the ejection effect of the latter. Thus, the burning zone is defined by the peripheral air inflow along the combustion chamber outer wall, deflectors, inner and outer walls of the combustion chamber, in which a single toroidal gas-dynamic vortex is created to stabilize burning. Some portion of primary air is fed into the combustion zone together with fuel via the vaporizer tubes. Fuel comes in contact with the hot tubes, vaporizes and is discharged into the vortex zone to be dispersed and burnt therein.

In a combustion chamber of such as design a single large toroidal vortex is created within the combustion zone under the ejection effect of a single high-energy air flow. The above-described combustion chamber has a number of drawbacks, namely: the composition of the air-fuel-gas mixture circulating in the vortex is dependent on the powerful ejection effect of the peripheral air flow, substantial variation of the velocity of the inflowing peripheral air flow under different operating conditions of the engine accordingly changes the ejection effect of this flow on the mixture composition within the toroidal vortex zone, making the mixture richer or leaner, thereby narrowing the range of steady-state burning in the combustion chamber.

Besides, the displacement of the vortex zone in which stabilized burning takes place towards the combustion chamber inner wall disturbs the optimum gas flow temperature distribution in the radial direction at the chamber outlet, displacing the temperature peak towards the gas turbine blade roots which diminishes the strength and service life of the blades and of the gas turbine as a whole.

One more combustion apparatus is known to be provided with fuel supply means and structural elements for delivery of primary air to stabilize burning.

The combustion chamber is so constructed and arranged in the casing of the engine that an annular duct for air flow is formed therebetween. The entry portion thereof is made in the shape of a truncated cone with its apex end facing the incoming air flow, the upstream end of the entry portion being apertured in the centre to provide an entry for primary air used for stabilization of burning, said inlet aperture accommodating guide vanes at the duct entry. A fuel injector is also mounted at the inlet in a coaxial manner. A swirler structure is installed at the outlet of the duct, whose vanes carry a deflector for positive deflection of the fuel-air mixture from the swirler to cause it to flow in the direction towards the end wall, said end wall having a conical disposition adapted to divide the discharged fluid upon its encounter with the wall and produce two toroidal vortices.

The first (smaller) vortex circulates radially inwards in the space confined between the deflector and end wall tapered end, while the second (larger) vortex circulates downstream of the deflector, within the combustion zone.

Other primary air inlet elements are provided to stabilize burning in the combustion chamber, said elements being made so that slotted passages are formed at the outer and inner diameters of the smaller vortex and at the periphery of the combustion chamber entry portion over the larger vortex outline.

The high-velocity air streams issuing from said slotted passages are tangential to the vortices, which promotes gas-dynamic stabilization of the latter.

The fuel-air mixture is ignited in the smaller vortex during engine start, which is followed by an ignition of the mixture within the larger vortex. As the engine rotational speed increases, the fuel-air mixture is enriched in the smaller vortex with the result that burning discontinues within the vortex. Conversely, with a reduction in the engine speed, which ultimately results in extinction of the flame in the larger vortex, the fuel-air mixture in the smaller vortex gets reignited by the larger vortex flame immediately before extinction of the latter.

In the combustion zone of said combustion chamber two vortices are produced: a smaller vortex providing for engine operation at starting and high-speed ratings, and a larger one ensuring engine operation at low-speed ratings. The vortices are separated by a stream of fuel-air mixture getting off the deflector at a velocity higher than that of the mixture turbulent burning, said stream thus constituting a gas-dynamic barrier hampering flame propagation from the larger (outer) vortex to the smaller one in the case of lower engine rpm as well as preventing removal of the combustion products from the smaller vortex.

All these drawbacks make the engine operation unreliable because of self-extinction at transient operating conditions.

Still another annular vaporizer-type reverse-flow combustion chamber is known, arranged within the engine casing so that annular air passageways are formed between the chamber and the engine casing outer and inner shells. The combustion chamber forward end wall is made in the shape of a half tore. Each of the cylindrical outer and inner walls of the combustion chamber constitutes a continuation in a generally axial direction of the respective end wall structure. Attached to said end wall are fuel vaporizer tubes used for delivery of primary air and fuel into the combustion zone. The combustion chamber walls and inwardly disposed deflectors attached to the outer wall are constructed so that annular slotted passages are formed for admission of an additional portion of primary air to stabilize the combustion process and for supply of secondary air into the dilution zone of the chamber.

The air admitted through the defined slotted passages into the combustion chamber space flows along the walls so that two toroidal counterflow vortices are created in the combustor. One vortex is adjacent the end wall, the other is formed nearer to the dilution zone.

Fuel prevaporized in the vaporizer tubes is brought into the vortex near the end wall. Ignition of fuel-air mixture is effected initially within this vortex during the engine start and mixture burning is sustained in the vortex during low-speed operation of the engine. The other vortex promotes thorough mixing of hot gases with secondary air.

With an increase in the engine rpm the fuel-air mixture is enriched in the first vortex and the following two processes will take place simultaneously in the second vortex: afterburning of the flammable mixture and dilution of hot gases with secondary air.

However, in the above embodiment of the combustion chamber, the air streams issuing from the slotted passages are brought primarily to the vortex periphery without interfering greatly with the cores of the vortices. As a result, only the fringe of each vortex is highly turbulized, while the vortex core flows are rather smooth due to the absence of such flow disturbing factors as, for instance, high-velocity air streams. Fuel is mixed with air and burns out predominantly in the vortex fringe which renders it impossible to burn a large amount of fuel within the combustion zone of a small volume due to incomplete combustion. To make combustion of fuel more efficient, it is common practice to make a combustion zone of a comparatively large volume in such a chamber with a resultant increase in the weight and bulk of the combustion chamber and of the engine as a whole. Two intensive vortices created in the chamber enhance the chamber hydraulic resistance, which results in a pressure loss and leads ultimately to a drop in the engine specific thrust.

It is an object of the present invention to increase the reliability of the combustion chamber and of the whole engine in service due to more reliable ignition and steady-state burning of fuel at any engine rating under any probable operating conditions.

Another object of the invention is to increase the efficiency and service life of the engine due to the achievement of uniform circumferential temperature field of the gas flow at the combustion chamber outlet with as complete utilization of fuel as possible.

Yet another object of the invention is to reduce the size and weight of the combustion chamber and engine by more efficient burning of fuel within the chamber combustion zone of a smaller volume. With these and other objects in view, the present invention resides in that an annular combustion chamber preferably intended for use in gas turbine engines is provided with structural elements for delivery of primary air to the combustion zone both for sustained ignition and steady-state burning of fuel and those for supply of secondary air into the dilution zone to reduce the temperature of the combustion products, wherein according to the invention, the flame-stabilizing primary air admission elements are arranged so that at least two successive annular slots are formed for tangential admission of a portion of primary air into the combustion zone, said slots being formed by concentrically curved combustion chamber forward wall plates that overlap one another so that the outer curved wall plate of the preceding passage serves as an inner curved wall plate for the passage downstream thereof, said passages being arranged successively downstream, each being preferably an annular curved slot of an essentially constant flow-passage area over the combustion chamber periphery.

The above construction of the primary air admission passages makes it possible to create a toroidal vortex of a definite gas-dynamic structure within the combustion zone due to an ejection effect of the air streams issuing from the slotted passages.

The curved slotted passages are formed about the same centre so that the outer curved wall plate of a preceding passage is an inner curved wall plate for the subsequent passage, said passages being arranged in succession downstream to ensure tangential admission of air onto the combustion zone at a velocity much greater than that of the vortex flow. Therefore an intensive wake turbulence is built up in the region wherein the high-velocity air streams mix with gas at the adjacent vortex fringe, with a resultant increase in mass and heat exchange within the vortex, which will have a favourable effect on mixing fuel with air, ignition of the fuel-air mixture and flame propagation throughout the annular combustion chamber.

A reliable and rapid start of the engine is thus ensured.

The above described construction of the primary air supply elements for stabilization of burning provides for gradual admission of primary air into the combustion zone in the form of high-velocity wake streams flowing around the toroidal vortex and dividing it into concentric toroidal sections.

All this permits deliberately enriching the mixture with fuel within the vortex core under any operating conditions of the engine and diluting the fuel-air mixture with air approximately to the stoichiometric composition, towards the vortex periphery. The presence of a zone of overrich fuel-air mixture in the vortex core and an increase in the proportion of primary air towards the vortex periphery, where the mixture gets stoichiometric, as well as unhampered evacuation of the combustion products from the vortex zone, having neither gas-dynamic nor structural obstacles, predetermine steady-state burning of fuel and ensure reliable operation of the engine at any rating under any probable environmental conditions. In addition, the high-velocity wake streams of air promote better gas-dynamic stabilization of the vortex, thereby contributing to a greater degree to steady-state burning of the fuel.

As a consequence of the primary air delivery elements being made in the form of curved slotted passages of essentially constant flow-passage area over the combustion chamber periphery, the toroidal vortex created by the high-velocity air streams issuing from said passages remains stable in its entirety and retains its gas-dynamic structure in a circumeferential direction throughout the combustion chamber.

Initial mixing of fuel vapour supplied from the vortex core zone of overrich fuel-air mixture with separate circular air streams and further mixing thereof following a spiral path within a single vortex maintain to a high degree a uniform distribution of fuel-air mixture over the combustion zone circumference, thorough mixing and essentially complete burning of the mixture within a smaller combustion chamber space, thereby ensuring a substantially uniform temperature field of combustion products in the circumferential direction.

All this contributes to the efficiency and results in a longer service life of the gas turbine and of the engine as a whole, thus offering a possibility of reducing the weight and bulk of the combustion chamber and engine.

Other objects and advantages of the invention will be readily understood from the following detailed description of a preferred embodiment thereof, in which references will be made to the accompanying drawing which is a longitudinal sectional view of a combustion chamber in accordance with the invention.

Referring to the FIGURE, an annular combustion chamber 1 of the reverse-flow vaporizer type is housed coaxially in a casing 2 so that an annular duct 3 is formed therebetween, said duct communicating with a dilution zone 5 of the combustion chamber 1 via dilution openings 4 and with a combustion zone 8 through vaporizer tubes 6 attached to an end wall 10 and slotted passages 7, 7a, 7b.

The slotted passages 7, 7a, 7b are intended for delivery of air into the combustion zone 8 substantially in a tangential manner, said passages being formed about one center 12 by opposite curved wall plates 9, 10, 11 overlapping one another and so arranged that, for example, the outer wall plate 10 of a preceding passage 7a is the inner wall plate 10 of the subsequent passage 7b downstream thereof and each of the subsequent passage 7b being displaced relative to the preceding passage 7a in the downstream direction. Each of the slotted passages 7, 7a 7b is essentially of a constant flow-passage area all over the combustion chamber 1 in the peripheral circumferential direction.

The radius of the inner wall plate 9 of the slotted passage 7a is denoted R in the FIGURE, the radius of each subsequent wall plate 10 or 11 downstream is greater than that of a respective preceding wall plate 9 or 10 by the passage width and the thickness of the stamped wall plate.

The number of the slotted passages is determined such as to admit the required amount of air into the combustion zone to maintain the excess air ratio close to unity. Three slotted passages are shown in the embodiment thus far described, but use may be made of two or more than three passages, if needed.

Said wall plates 9, 10, 11 are interconnected by means of local ribs 13 made in the shape of vanes giving an angle of swirl to the issuing air in operation.

Ribs 13 may be prefabricated, for instance, in the wall plate 10 or may be made as separate strips.

To facilitate assembly of the combustion chamber, the local ribs 13 are provided with substantially axial notches 14 through which access may be gained for welding the wall curl plates. Said notches 14 allow the combustion chamber sections to be displaced relative to one another, thereby making centering of the sections easy.

Installed coaxially with the vaporizer tubes 6 are fuel spraying nozzles 15 communicating with a ring-shaped fuel manifold 17 via precision holes 16, said fuel manifold being attached to the end wall of the casing 2 by means of supporting brackets 18.

The combustion chamber outlet end is telescopically inserted into a nozzle box 19 located coaxially in a casing 20 so that an annular diffuser 21 is formed therebetween. Mounted on the combustion chamber casing 2 is a starting igniter 22 whose function is to initiate ignition of fuel in the combustion zone 8 of the combustion chamber 1.

The annular combustion chamber 1 of the vaporizer type operates as follows.

From the diffuser 21 air flows to the annular duct 3, wherefrom a greater portion of said comburrent agent (secondary air) is admitted gradually into the dilution zone 5 of the combustion chamber 1 by way of secondary air admission elements formed in the shape of air dilution openings 4, the remaining portion of said inflow constituting primary air naturally flows along the combustion chamber to be conveyed into the combustion zone 8 partially through the vaporizer tubes 6 which are mounted at the forward end of the combustion chamber 1 and through the slotted curved passages 7, 7a, 7b which are arranged at the same forward end of the chamber so as to provide tangential admission of this portion of primary air to stabilize burning. High-velocity wake streams issuing from the slotted passages 7, 7a, 7b produce an ejection effect and create a toroidal vortex of a definite gas-dynamic structure. Since the stream discharge velocity is much greater than that of the flows within the vortex due to a substantial energy loss resulting from free expansion, high velocity gradients occurring in the wake-and-vortex boundary produce a zone of intensive turbulence, thereby facilitating mass and heat exchange as well as thoroughly mixing fuel with air within the vortex and offering more favourable conditions for fuel burning.

In view of the fact that slotted passages 7, 7a, 7b have a constant flow-passage area throughout the combustion chamber circumference, the toroidal vortex created by the air wake streams issuing from said passages retains its shape and gas-dynamic structure in its entirety in the annular combustion chamber. Displacement of each subsequent slotted passage relative to the preceding one, both with regard to the flow direction and outwards relative to their common centre, makes it possible to admit air into the combustion zone gradually in the form of wake streams flowing around the vortex, producing an ejection effect and forming concentric toroidal flows within the vortex.

The delivery of air in that way provides for deliberate enrichment of the combustible mixture with fuel in the vortex central zone A under any operating conditions of the engine and for further dilution of the fuel-air mixture with air approximately to the stoichiometric composition towards the vortex periphery.

Whenever the engine operating conditions vary with a consequent change in the fuel consumption and air flow rate, the central overrich zone A of the vortex changes is size without dying out.

The presence of the overrich zone A in the vortex and gradual dilution of the overrich fuel-air mixture with air to stoichiometric mixture at the vortex periphery as well as unhampered removal of the combustion products along the flow path having neither gas-dynamic nor structural obstacles predetermine steady-state burning in the combustion chamber and dependable operation of the engine at any rating under any probable environmental conditions.

In addition, the high-velocity wake streams of air promote gas-dynamic stabilization of the vortex, thereby better contributing to steady-state burning of the fuel air mixture.

Fuel is fed into the combustion chamber together with primary air flowing through the vaporizer tubes 6. It is finely sprayed with the aid of fuel nozzles 15 communicating with fuel manifold 17.

Said atomized fuel comes in contact with the hot walls of the vaporizer tubes and vaporizes rapidly. The vaporizer tubes 6 are heated, during start, by the flame produced in the igniter 22 and, during operation, by the hot gas flow resulting from combustion of fuel.

The prevaporized fuel issues from the exit of the vaporizer tubes 6 to be brought into the central zone A of the vortex, wherein the fuel-air mixture is enriched and dispersed in the vortex both radially and circumferentially. The fuel vapour found in the vortex central overrich zone A is initially mixed with air in separate streams surrounding the toroidal vortex, then is further diluted with air in its motion along a curved path within a single toroidal vortex highly turbulized by these wake streams and is additionally caused to follow a spiral path at a substantial angle of swirl under the action of the air discharged through slotted passages 7, 7a, 7b provided, e.g., with swirl ribs 13. All this makes the fuel-air mixture flow path longer, offering a possibility of proper preparation of the mixture for burning and providing for efficient burning of fuel in a chamber of a smaller volume with a resultant substantially uniform combustion gas temperature field in the circumferential direction.

The above features increase the operating efficiency and service life both of the gas turbine and engine and permits reducing the weight and bulk both of the combustion chamber and the engine.

The combustion products are carried off from the combustion zone 8 to the dilution zone 5 to be mixed with secondary air admitted through the dilution opening 4. As a result, the gas flow temperature drops to a predetermined level. On leaving said dilution zone, the gas flows to the nozzle box 19 to be further delivered to the gas turbine installed downstream of the nozzle box.

A combustion chamber constructed in accordance with the present invention and incorporated into a gas turbine engine provides for:

higher reliability of the engine in service due to reliable ignition and steady-state burning of fuel in the combustion chamber at any engine rating under any probable operating conditions;

higher operating efficiency and longer service life of the engine due to substantially complete burning of fuel in the combustion chamber and uniform circumferential gas temperature field at the combustion chamber outlet;

reduced weight and bulk both of the combustion chamber and engine as a whole on account of efficient burning of fuel within a combustion chamber combustion zone of a smaller volume.

What is claimed is:

1. An improved annular combustion chamber for a gas turbine engine, employing a combustion zone; a dilution zone; fuel means; delivery means for delivery of fuel and primary air to a combustion zone; passage means for supplying a part of primary air to stabilize and intensify burning; passage means for the delivery of secondary air into a dilution zone for reducing the temperature of combustion products, wherein: said means for supplying primary air to stabilize and intensify burning are in the form of at least two slotted passages formed by opposite surfaces of concentric toroidal sections originating at a single center in the combustion zone whereby the end of a preceding section overlaps the beginning of a following section, and said center is determined by the center of the radius of a circle forming the toroidal section being greater by the total value of the thickness of the wall of the preceding toroidal section and height of the passage between them, and each following passage being displaced downstream relative to the preceding channel to ensure an air stream flow in the combustion zone along a helical line having center different to the axis of symmetry of the annual combustion chamber.

* * * * *